(12) United States Patent
Klink et al.

(10) Patent No.: US 11,179,675 B2
(45) Date of Patent: Nov. 23, 2021

(54) REACTOR FOR REDUCING NITROGEN OXIDES

(71) Applicant: SHELL OIL COMPANY, Houston, TX (US)

(72) Inventors: Wassim Klink, Sugar Land, TX (US); Guido Seng, The Woodlands, TX (US); Wenzhong Zhang, Katy, TX (US); Andreas Klemt, Leuna (DE); Paul Benjerman Himelfarb, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/064,200

(22) PCT Filed: Dec. 20, 2016

(86) PCT No.: PCT/US2016/067655
§ 371 (c)(1),
(2) Date: Jun. 20, 2018

(87) PCT Pub. No.: WO2017/112618
PCT Pub. Date: Jun. 29, 2017

(65) Prior Publication Data
US 2018/0369753 A1    Dec. 27, 2018

Related U.S. Application Data

(60) Provisional application No. 62/270,853, filed on Dec. 22, 2015.

(51) Int. Cl.
*B01J 35/04* (2006.01)
*F01N 3/28* (2006.01)
(Continued)

(52) U.S. Cl.
CPC ..... *B01D 53/8631* (2013.01); *B01D 53/8625* (2013.01); *B01D 53/9409* (2013.01);
(Continued)

(58) Field of Classification Search
None
See application file for complete search history.

(56) References Cited

U.S. PATENT DOCUMENTS 3,111,396 A     11/1963   Ball
4,027,476 A *   6/1977    Schmidt .................. B01J 35/02
                                                                       60/218
(Continued)

FOREIGN PATENT DOCUMENTS

CN        1046473 A      10/1990
CN      101172257 A       5/2008
(Continued)

OTHER PUBLICATIONS

Masuda, Senichi et al. "Electrostatic Precipitation of Carbon Soot from Diesel Engine exhaust". IEEE Transactions of Industry Applications, vol. IA-19, No. 6. 1104. (1983). (Year: 1983).*
(Continued)

*Primary Examiner* — Sheng H Davis
(74) *Attorney, Agent, or Firm* — Shell Oil Company

(57) ABSTRACT

A reactor for reducing the concentration of NOx in a stream comprising: an inlet for the stream; an outlet for a stream containing a reduced concentration of NOx; one or more catalyst beds comprising a ceramic or metallic foam with a NOx reduction catalyst; one or more flow paths from the inlet to the outlet that passes through at least one catalyst bed wherein the catalyst beds are closed at the top and bottom so that the flow path through the catalyst bed passes through the sides of the catalyst bed in a lateral flow is described.

21 Claims, 3 Drawing Sheets

(51) Int. Cl.
*B01D 53/86* (2006.01)
*B01D 53/94* (2006.01)
*B01J 21/16* (2006.01)
*B01J 23/22* (2006.01)
*B01J 23/28* (2006.01)
*B01J 23/30* (2006.01)

(52) U.S. Cl.
CPC .......... *B01D 53/9431* (2013.01); *B01J 21/16* (2013.01); *B01J 23/22* (2013.01); *B01J 23/28* (2013.01); *B01J 23/30* (2013.01); *B01J 35/04* (2013.01); *F01N 3/2828* (2013.01); *B01D 2255/90* (2013.01); *B01D 2255/9155* (2013.01); *B01D 2255/9205* (2013.01); *B01D 2257/402* (2013.01); *B01D 2257/404* (2013.01)

(56) References Cited

U.S. PATENT DOCUMENTS

| | | | | |
|---|---|---|---|---|
| 4,031,185 | A * | 6/1977 | Akimoto | B01D 53/8628 423/239.1 |
| 4,044,102 | A | 8/1977 | Muraki et al. | |
| 4,314,913 | A * | 2/1982 | Derrien | B01D 53/8628 502/354 |
| 4,617,289 | A | 10/1986 | Saito et al. | |
| 4,663,300 | A | 5/1987 | Lester et al. | |
| 4,780,290 | A * | 10/1988 | Curtius | B01D 53/508 423/244.07 |
| 5,413,699 | A | 5/1995 | Chou | |
| 5,536,477 | A * | 7/1996 | Cha | B01D 53/32 422/171 |
| 6,117,405 | A * | 9/2000 | Frey | B01D 53/8625 423/210 |
| 6,125,629 | A | 10/2000 | Patchett | |
| 6,419,889 | B1 | 7/2002 | Boxhoorn et al. | |
| 6,562,749 | B1 * | 5/2003 | Lednor | B01J 37/0201 502/66 |
| 7,062,904 | B1 | 6/2006 | Hu et al. | |
| 7,255,848 | B2 | 8/2007 | Deluga et al. | |
| 7,506,504 | B2 | 3/2009 | Kumar | |
| 9,475,002 | B2 * | 10/2016 | Boorse | B01D 53/9431 |
| 2002/0159925 | A1 * | 10/2002 | Platvoet | B01D 53/8631 422/177 |
| 2003/0100446 | A1 | 5/2003 | Hase et al. | |
| 2004/0118747 | A1 | 6/2004 | Cutler et al. | |
| 2004/0219084 | A1 | 11/2004 | Hall et al. | |
| 2005/0159292 | A1 | 7/2005 | Pham et al. | |
| 2007/0009401 | A1 | 1/2007 | Koibeck et al. | |
| 2007/0144828 | A1 | 6/2007 | Galligan | |
| 2009/0142243 | A1 * | 6/2009 | Eiteneer | F23J 15/003 423/239.1 |
| 2010/0284875 | A1 | 11/2010 | Koermer | |
| 2012/0258855 | A1 * | 10/2012 | Dekker | B01J 37/0225 502/240 |
| 2013/0034477 | A1 * | 2/2013 | Heidenreich | B01D 53/8631 422/630 |
| 2014/0050626 | A1 | 2/2014 | Heidenreich | |
| 2015/0030515 | A1 * | 1/2015 | Deuerlein | B01D 53/8628 423/212 |
| 2015/0182974 | A1 | 7/2015 | Gao et al. | |
| 2016/0045868 | A1 | 2/2016 | Sonntag et al. | |
| 2018/0369800 | A1 | 12/2018 | Klink et al. | |
| 2019/0001266 | A1 | 1/2019 | Seng et al. | |

FOREIGN PATENT DOCUMENTS

| | | |
|---|---|---|
| CN | 101287550 A | 10/2008 |
| CN | 101595283 A | 12/2009 |
| CN | 101605597 A | 12/2009 |
| CN | 102019194 A | 4/2011 |
| CN | 201930777 U | 8/2011 |
| CN | 202270481 U | 6/2012 |
| CN | 103781532 A | 5/2014 |
| CN | 105289676 A | 2/2016 |
| JP | S5710319 A | 1/1982 |
| JP | S6312348 A | 1/1988 |
| JP | 2003522873 A | 7/2003 |
| JP | 2006212515 A | 8/2006 |
| WO | 2004089508 A | 10/2004 |
| WO | 2009083593 A1 | 7/2009 |

OTHER PUBLICATIONS

International Search Report and Written Opinion received for PCT Patent Application No. PCT/US2016/067655, dated Apr. 12, 2017, 11 pages.

Cheng, "Rolling Regeneration Trap for Diesel Particulate Control", SAE Technical Paper Series, Journal of Fuels and Lubricants, vol. 112, Section 4, Oct. 27, 2003, pp. 2373-2380, XP055359369.

Mehta et al., "A Correlation for Soot Concentration in Diesel Exhaust Based on Fuel-air Mixing Parameters", Fuel, vol. 71, Issue No. 6, Jun. 1, 1992, pp. 689-692, XP025457526.

Richardson et al., "Properties of Ceramic Foam Catalyst Supports: Pressure Drop", Applied Catalysis A: General, vol. 204, Issue No. 1, Nov. 6, 2000, pp. 19-32, XP004272515.

Walther et al., A New PM Process for Manufacturing of Alloyed Foams for High Temperature Applications Conference Paper, Oct. 2010, 8 pages.

International Search Report and Written Opinion received for PCT Patent Application No. PCT/US2016/067651, dated Apr. 12, 2017, 13 pages.

International Search Report and Written Opinion received for PCT Patent Application No. PCT/US2016/067648, dated Apr. 6, 2017, 12 pages.

* cited by examiner

REACTOR FOR REDUCING NITROGEN OXIDES

CROSS REFERENCE TO RELATED APPLICATIONS

This is a national stage application of International Application No. PCT/US2016/067655, filed 20 Dec. 2016, which claims benefit of priority to U.S. Application No. 62/270,853, filed 22 Dec. 2015.

FIELD OF THE INVENTION

The invention relates to a reactor comprising one or more $NO_x$ reduction catalysts on a ceramic or metallic foam and a method for reducing the $NO_x$ concentration in a gas stream.

BACKGROUND OF THE INVENTION

Oxides of nitrogen are common by-products and/or desirable intermediates in a number of industrial processes, including the manufacture of chemicals, such as nitric acid, or combustion processes in air. Nitrogen oxides of the formula NO and NO2 are typically referred to together as $NO_x$. $NO_x$ is a large scale pollutant and significant efforts have been made for the reduction of $NO_x$ in exhaust gas streams from processes in which they are produced. Processes for removal of $NO_x$ from gas streams are generally referred to in the art as $DeNO_x$ processes and the catalysts used therein as $DeNO_x$ catalysts.

The prior art describes processes where the dust in a gas stream containing NOx that is to be treated is captured on the catalyst and then removed from the catalyst by cleaning or another means. For example, U.S. Pat. No. 4,044,102 describes a reactor that is effective for reducing nitrogen oxides and dust from a flue gas stream. The catalyst is passed in a moving bed such that it contacts with the gas and entrains the dust. The catalyst is then passed through an outlet where it is regenerated and the dust is removed. The patent teaches that dust is preferably removed from the gases prior to removal of $NO_x$ to prevent dust from accumulating on the surface of the catalyst bed and in the interstices between the catalyst particles.

As another example, U.S. Pat. No. 5,413,699 describes a reactor where a gas containing dust and $NO_x$ is passed through a catalyst bed at a sufficient velocity to fluidize the catalyst bed. Particulates deposited on the catalyst are abraided or elutriated away by fluidization to prevent fouling of the $deNO_x$ catalyst. The patent teaches that dust loadings of 10-50 $mg/Nm^3$ are too high to permit long service life of a commercially available $deNO_x$ catalyst.

In addition, a number of patents and published applications relate to the use of ceramic foams for treating diesel engine exhaust gases. For example, U.S. Pat. No. 5,536,477 describes a ceramic foam filter that has the capacity to trap substantially all soot present in the exhaust gas stream.

Fixed bed catalyst systems can provide the removal of NOx from process streams at lower temperatures due to their excellent activity; however, they also tend to trap a majority of the particulates in the gas stream and hence experience rapid pressure drop increases. On the other hand, honeycomb catalyst systems allow particulate matter to pass through easily, but they have much lower activity and therefore require much higher temperatures of operation. It would be preferred to provide a catalyst and a process that allowed for the efficient removal of NOx from particulate-containing gas streams at low temperatures while at the same time allowing a majority of the dust to pass through the catalyst bed and not be trapped on the catalyst.

The reactor can also be configured in such a way to prevent the dust from accumulating on the fixed bed NOx reduction catalyst.

SUMMARY OF THE INVENTION

The invention provides a reactor for reducing the concentration of $NO_x$ in a stream comprising: an inlet for the stream; an outlet for a stream containing a reduced concentration of $NO_x$; one or more catalyst beds comprising a ceramic or metallic foam with a $NO_x$ reduction catalyst; one or more flow paths from the inlet to the outlet that passes through at least one catalyst bed wherein the catalyst beds are closed at the top and bottom so that the flow path through the catalyst bed passes through the sides of the catalyst bed in a lateral flow.

The invention also provides a method for reducing the concentration of $NO_x$ in a dust containing gas stream comprising: passing a first gas stream containing $NO_x$ into a reactor comprising one or more catalyst beds; contacting the first gas stream with ceramic or metallic foam catalyst beds having interconnected pores that provide a lateral flow path through the catalyst bed wherein the catalyst bed comprises a $NO_x$ reduction catalyst to produce a second gas stream with a reduced $NO_x$ concentration; and passing the second gas stream out of the contacting zone wherein the first gas stream has a dust concentration of at least 5 $mg/Nm^3$ and the second gas stream comprises at least 50% of the amount of dust in the first gas stream.

DETAILED DESCRIPTION OF THE INVENTION

Figure 1:
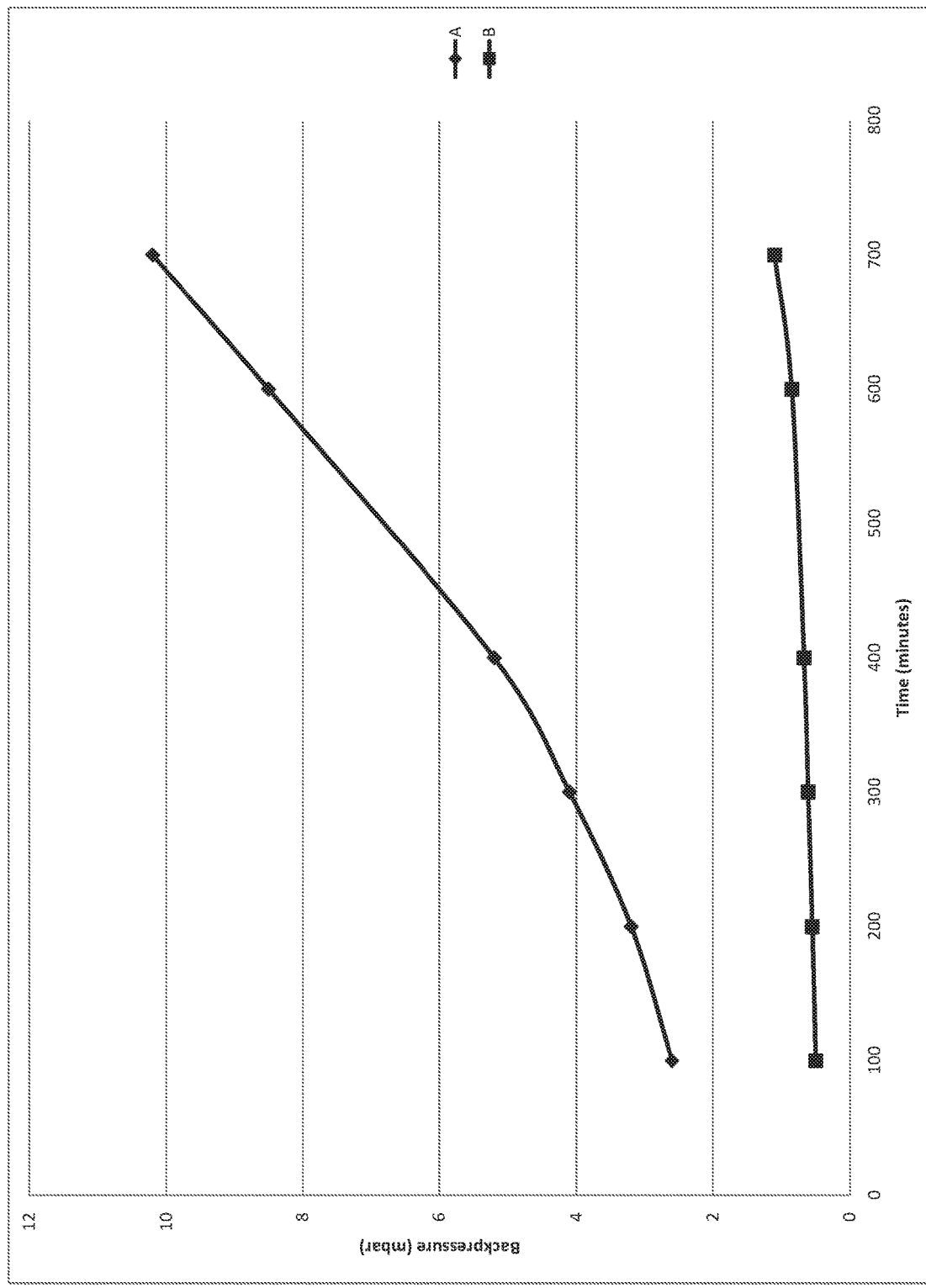
FIG. 1 displays the results of Example 1
FIG. 2 displays the results of Example 2

The ceramic or metallic foam catalyst bed of the present invention allows the particulates in the gas stream to pass through while treating the gas to reduce $NO_x$. This catalyst is useful to treat exhaust gas from industrial complexes. The ceramic foams that have been described for use in emission control of automobile engines have high pores per inch to trap the soot and particulates. The foams of the present invention have lower pores per inch. The term "dust" as used herein comprises any small particulates that can potentially remain behind on the catalyst bed as the gas stream passes through.

The foam of the present invention allows a majority of the dust to pass through without plugging the system while treating the exhaust gas to remove $NO_x$. The catalyst bed of the present invention is especially useful to treat exhaust gas from industrial processes, and stationary turbines.

Further, when this catalyst is used in catalyst modules in a lateral flow arrangement a lower pressure drop is achieved which is a key factor in treating exhaust gas streams. A catalyst module is a container that holds one or more catalyst beds which are typically in parallel arrangement. The catalyst beds may be very thin and they can be stacked side by side in the Lateral Flow Reactor (LFR). The thin nature of the catalyst bed allows for a lower pressure drop which is advantageous in flue gas treatment applications. In addition, the thin layer of ceramic or metallic foam makes it easier for dust to pass through without being trapped in the foam. A thick foam has a higher likelihood of plugging with dust and particulates. A result of using a plurality of very thin layers of foam is that it provides a higher flow area and a lower ratio of dust concentration to frontal surface area of the foam. This will reduce the likelihood of plugging at the face of the catalyst bed and lower the pressure drop across the foam because, according to Darcy's law, pressure drop is inversely proportional to the flow area of a filter.

Due to the tortuous channels inside the foam structure, the gas molecules are mixed after entering the channels and the diffusion to active catalytic sites on the foam surface is enhanced. On the other hand, typical honeycomb catalyst or other monoliths with straight channel flow paths have a limited diffusion with active catalytic sites. This is further impacted if the linear velocity of the gas stream is low, for example, less than 20 m/s which results in a laminar flow.

In this reactor, gas enters the reactor in numerous gas inlet channels which are blocked at the opposite end. The gas must then travel laterally through fixed catalyst beds to reach the outlet channels.

The individual catalyst beds have a lateral thickness (i.e., across the bed in the direction of gas flow) of less than 15 cm, preferably less than 10 cm. The individual catalyst beds preferably have a lateral thickness of from 2.5 to 15 cm, preferably of from 4 to 10 cm.

In the reactor, the gas stream passes from the inlet, through one or more catalyst beds and to the outlet of the reactor. In one embodiment, the gas stream only passes through one catalyst bed as it goes from the inlet to the outlet.

Figure 3:
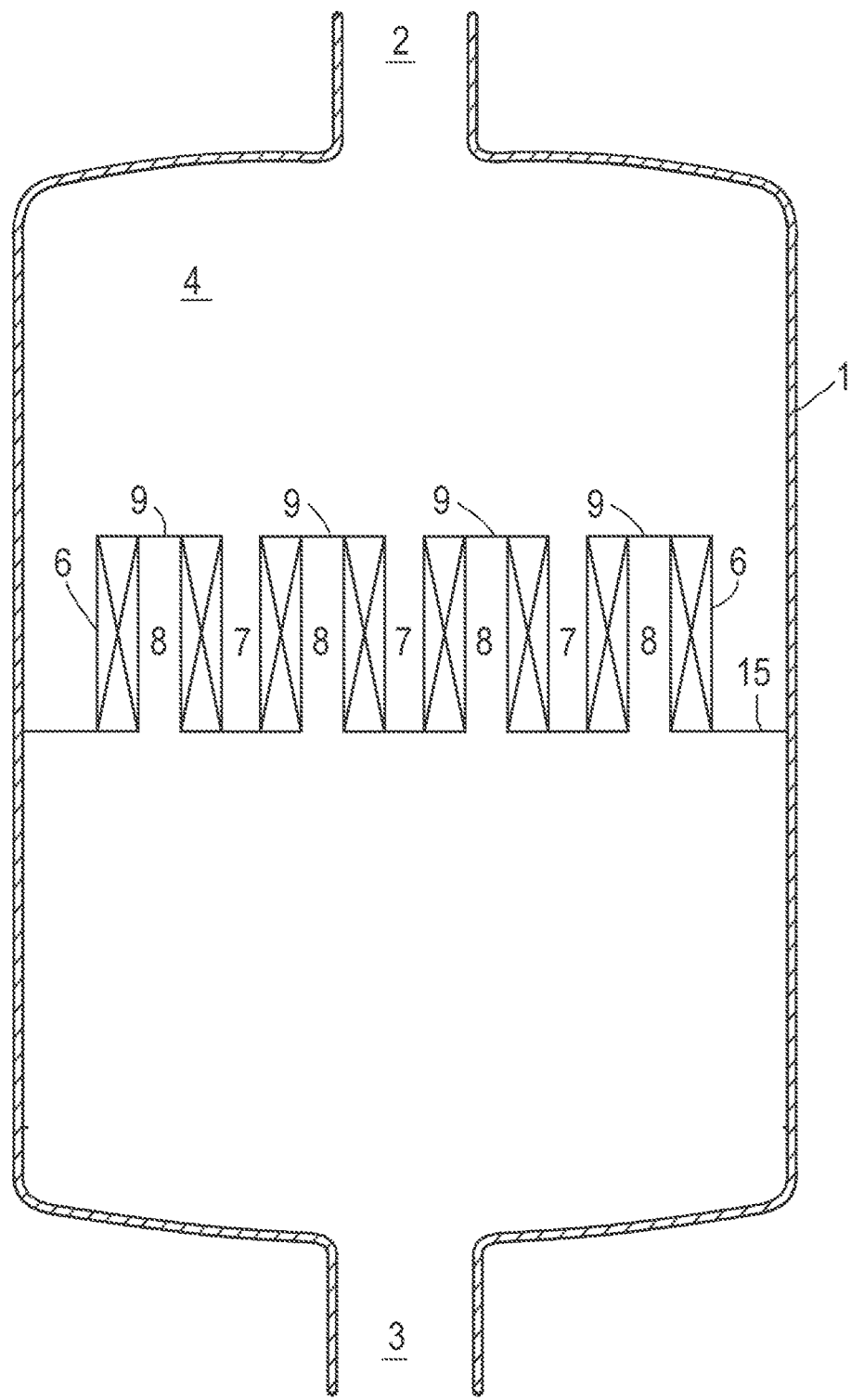
FIG. 3 depicts an embodiment of the lateral flow reactor (LFR).

One embodiment of a lateral flow reactor (LFR) is shown in FIG. 3. The LFR may be a vessel of any shape that contains one or more sets of catalyst beds. For example, the gas stream can pass through one catalyst bed and then pass through another catalyst bed located downstream of the first catalyst bed. In FIG. 3, the reactor 1 has an inlet for flue gas 2 and an outlet for treated gas 3. The flue gas passes from the inlet 2 through entrance zone 4 and into the flow inlet area 7. The flue gas passes through one of the fixed catalyst beds 6 and into the flow outlet area 8. The fixed catalyst beds are closed at both ends. The side walls of the fixed catalyst beds are gas permeable. The treated gas then flows to the outlet 3. The catalyst beds and flow outlet areas 8 are blocked from the entrance zone 4 by closing plates 9 to prevent the flow from bypassing the catalyst beds. An additional closing plate 15 is located between the catalyst beds and the wall of the reactor. The gas flows laterally through the catalyst beds.

The ceramic foam may comprise any ceramic material that can provide sufficient strength and provides a suitable carrier for the $NO_x$ reduction catalyst. The ceramic foam preferably comprises cordierite, titanium oxide, alumina or mixtures thereof.

The metallic foam may, likewise, comprise any metallic material that can provide sufficient strength and is also a suitable carrier for the $NO_x$ reduction catalyst. The metallic foam preferably comprises nickel, iron, aluminum, chromium or alloys thereof.

In one embodiment, a ceramic foam may be made by filling the pores of a foamed polymer, for example, polyurethane, with an aqueous slurry of ceramic, for example, $Al_2O_3$, $ZrO_2$. The slurry may contain 0.1 to 10 µm diameter particles in water, with appropriate amounts of wetting agents, dispersion stabilizers and viscosity modifiers. The wet foam is dried and calcined in air at temperatures above 1000° C. The polymer vaporizes or burns and the ceramic particles sinter. In another embodiment, the viscosity of the slurry may be increased by adding thickening agents. This method is further described in J. T. Richardson, Properties of Ceramic Foam Catalyst Supports: Pressure Drop, Applied Catalysis A: General 204 (2000) 19-32 which is herein incorporated by reference.

In one embodiment, a metallic foam may be made by a powder metallurgical process that converts nickel or iron foams into a high-temperature stable alloy. In this process, the nickel or iron foam is continuously unwound, coated first with a binder solution using a spraying technique and then with a high alloyed powder. After, the foam is cut into sheets of the desired size. This method is further described in G. Walther et al, A New PM Process for Manufacturing of Alloyed Foams for High Temperature Applications, PM 2010 World Congress—Foams and Porous Materials which is herein incorporated by reference.

The foam has a void space of at least 60%, preferably at least 70% and more preferably at least 80%. Void space is defined as the volume of the structure that is open divided by the total volume of the structure (openings and ceramic or metallic) multiplied by 100.

The ceramic and metallic foams have an interconnected internal tortuous pore structure. This may also be referred to as having a reticulated structure. This structure results in a flow of gases through the foam that is turbulent which leads to improved contact with the catalyst compared to the laminar flow inside honeycomb channels.

The tortuosity of the ceramic or metallic foam is preferably greater than 1.0, more preferably greater than 1.5 and most preferably greater than 2.0. Tortuosity may be calculated as the ratio of the length of the flow path taken by the gas through the ceramic or metallic foam divided by the length of the shortest straight line path from the inlet to the outlet of the ceramic or metallic foam. A straight channel path has a tortuosity of 1.0.

The ceramic or metallic foam has from about 5 to about 50 pores per inch, preferably from about 10 to about 30 pores per inch. The pores per inch of the foam impacts the ability of the foam to allow dust to pass through the catalyst bed.

In one embodiment, the metallic foam has a density in the range of from 0.4 to 0.75 g/cm3. This provides a lightweight foam that can be used to treat these gases.

Any $NO_x$ reduction catalyst may suitably be used in the process of the present invention, for example those described in U.S. Pat. No. 6,419,889. An exemplary catalyst from U.S. Pat. No. 6,419,889 comprises a titania carrier and one or more metal compounds selected from the group consisting of vanadium, molybdenum and tungsten. In one embodiment, the $NO_x$ reduction catalyst is a vanadium on titania catalyst. In another embodiment, the $NO_x$ reduction catalyst is a vanadium and tungsten on titania catalyst.

Other suitable catalysts include oxides of metals such as aluminum, copper, iron, cobalt, tin, chromium, nickel, manganese, titanium, silver, platinum, rhodium, palladium or mixtures thereof. The metal oxides may be supported on any conventional carrier or other material, for example, alumina, silicon-alumina, magnesia-alumina, titania, alumina, calcium oxide-alumina, chromium oxide-alumina, or silica-chromium oxide-alumina.

In addition, zeolitic catalysts containing copper or iron may be used for $NO_x$ reduction. One preferred example is iron-exchanged zeolite beta. The zeolitic catalyst may comprise other metals such as platinum, ruthenium, palladium, osmium, rhodium or mixtures thereof.

The catalyst may have a surface area measured by nitrogen adsorption of between about 70 m$^2$/g and about 150 m$^2$/g. The catalyst may have a bimodal pore distribution with more than 90% of the pore volume present in pores having a diameter of at most about 100 nm, where the pore volume is considered to be the pore volume present in pores having a diameter between about 1 nm and about 10$^4$ nm.

The catalyst can be made by impregnating or deposition of a carrier with the metal compound(s) after drying and calcining the carrier or after extruding, then drying and then calcining the carrier. The impregnation may be carried out by contacting the carrier with an aqueous solution of the metal compound(s). In one embodiment, a metal oxalate solution can be used for the impregnation. The catalyst can also be made by co-mulling the carrier along with metal compounds to form a solid mixture. The catalyst formed according to these methods can be grinded or milled to a certain particle size distribution in a slurry before it is applied by coating on the ceramic or metallic foam.

Another method for adding the catalyst to the foam is deposition of the catalyst by pore volume impregnation of the carrier and then depositing the impregnated carrier on the foam. A further method comprises making a washcoat slurry of the metals, for example, titanium and vanadium and then depositing that on the foam.

The NO$_x$ reduction catalyst may also comprise a binder material which helps bind the catalyst to the support and/or to the ceramic or metallic foam.

The method for reducing the concentration of NO$_x$ in a particulate containing gas stream comprises passing a first gas stream containing NO$_x$ into a contacting zone. The gas stream may come from a number of sources including power plants, thermal cracking furnaces, incinerators, metallurgical plants, fertilizer plants and chemical plants. The gas stream comprises a significant level of dust.

The gas stream comprises at least 5 mg/Nm$^3$ of dust. The method of the present invention can handle gas streams with at least 10 mg/Nm$^3$ of dust. The method is capable of handling gas streams with at least 20 mg/Nm$^3$ of dust, preferably at least 30 mg/Nm$^3$ of dust and more preferably at least 70 mg/Nm$^3$ of dust.

The gas stream is contacted with a ceramic or metallic foam catalyst bed wherein the catalyst bed comprises a NO$_x$ reduction catalyst to produce a second gas stream. The catalyst bed has one or more flow paths through the catalyst bed that enables contact between the gas stream and the NO$_x$ reduction catalyst.

The reduction of NO$_x$ in the gas stream can occur at a pressure in the range of from 0 kPa to 1200 kPa and at a temperature in the range of from 100° C. to 400° C. The temperature is preferably in a range of from 100° C. to 350° C., more preferably of from 100° C. to 250° C. and most preferably of from 140° C. to 220° C.

Many catalysts require higher temperatures to achieve a high conversion of NO$_x$. It is preferred to use a catalyst that has high activity and selectivity at the temperatures described above so that lower temperatures can be used. Under the contacting conditions, the NO$_x$ reduction catalyst can remove at least a majority of the NO$_x$ by chemical conversion. The second gas stream contains at most 40% of the NO$_x$ present in the feed gas stream. This second gas stream contains at most 25% of the NO$_x$ present in the first gas stream, preferably at most 5% of the NO$_x$ present in the first gas stream and more preferably at most 1% of the NO$_x$ present in the first gas stream.

The second gas stream contains at least 50% of the dust that was present in the first gas stream that was fed to the catalyst bed. The second gas stream preferably comprises at least 60% of the dust that was present in the first gas stream and more preferably at least 80% of the dust that was present in the first gas stream.

EXAMPLES

Example 1

In this example, a fixed catalyst bed of deNOx catalyst pellets (A) and a fixed catalyst bed of ceramic foam deNOx catalyst (B) were tested to determine the effect of passing a gas stream with a high dust loading through the catalyst bed. The catalyst pellets were 3.2 mm trilobe shaped pellets. The ceramic foam deNOx catalyst had 18 pores per inch. The test was carried out in a dust filtration lab and comprised passing air containing dust at a concentration of 70 mg/Nm$^3$ through the catalyst bed. The average particle size of the dust was 1 micron. The same particles and concentration were used to compare the two types of catalyst beds. The pressure drop across the catalyst bed at ambient temperature and pressure was measured. The results of this test are shown in FIG. 1 where the back pressure is plotted as a function of time in minutes during which the air stream containing dust was passed through the catalyst bed.

As can be seen from the figure, the ceramic foam catalyst initially had a lower backpressure than the catalyst pellets. Further, as the dust was passed through the catalyst beds, the backpressure of the ceramic foam increased only slightly, while the backpressure of the pellet catalyst increased rapidly to the maximum system design pressure. At this point, the catalyst pellets would have had to be cleaned before they could continue to be used.

In addition to measuring the backpressure, the amount of dust that passed through the ceramic foam catalyst bed was measured. Initially, when the testing started, 60% of the dust entering the ceramic foam passed through the catalyst bed. After the air stream had passed through the ceramic foam catalyst bed for a given time, the amount of dust passing through the foam was determined to be 64%. This example shows that the ceramic foam catalyst bed can be operated under high-dust conditions, and that the catalyst pellets cannot be operated effectively under high-dust conditions.

Example 2

Figure 2:
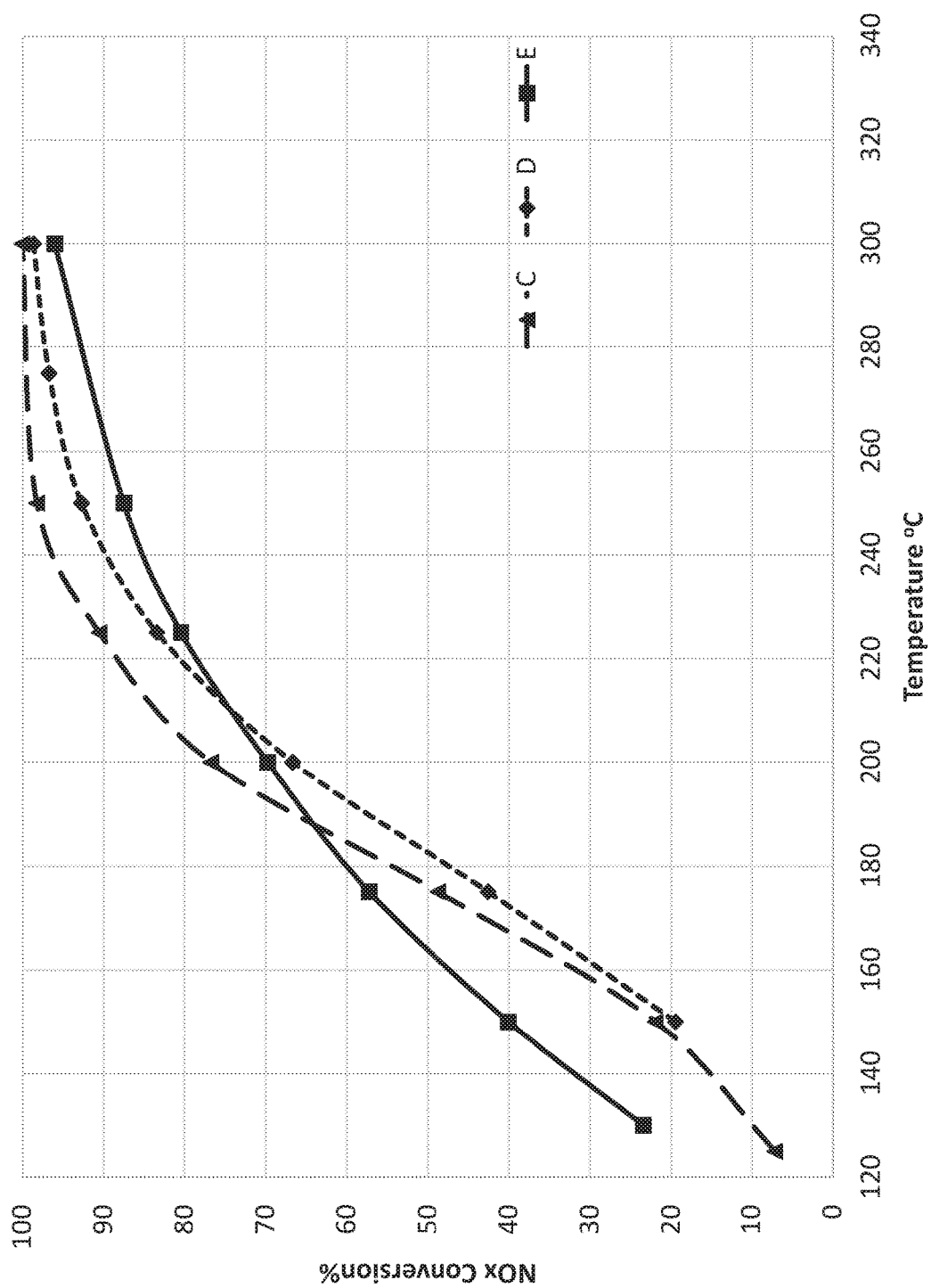

In this example, three catalysts were tested to determine their activity for NOx conversion. The first test (C) used a ceramic foam catalyst with 30 pores per inch. The second test (D) used a ceramic foam catalyst with 18 pores per inch. The third test (E) used 3.2 mm trilobe shaped catalyst pellets. The test was carried out in a fixed bed reactor with the same volume of catalyst loading for all three tests. The space velocity for all three tests was maintained at a constant 22,000 hr-1 and the tests were carried out at ambient O2 with the balance being nitrogen. The concentration of NO before and after the catalyst bed was monitored separately using an FTIR instrument. The results of the example are displayed in FIG. 2. As can be seen from the figure, ceramic foam has a comparable activity to the catalyst pellets and a higher activity than the catalyst pellets at higher temperatures.

These examples show that the ceramic foam catalyst can be used to effectively reduce the level of NOx in a gas stream, and further that the ceramic foam catalyst bed can be used under high-dust conditions.

That which is claimed is:

1. A method for reducing a concentration of $NO_x$ in a dust containing gas stream comprising:
   a. feeding a first gas stream containing $NO_x$ into a reactor in a first flow direction, wherein the reactor comprises a contacting zone having one or more catalyst beds;
   b. contacting the first gas stream with a ceramic or metallic foam catalyst disposed within the one or more catalyst beds and having interconnected pores that provide a lateral flow path through the one or more catalyst beds, wherein the ceramic or metallic catalyst comprises a $NO_x$ reduction catalyst configured to produce a second gas stream with a reduced $NO_x$, concentration, and wherein contacting the first gas stream with the ceramic or metallic foam catalyst comprises passing the first gas stream through the one or more catalyst beds in a second flow direction that is different from the first flow direction; and
   c. passing the second gas stream out of the contacting zone, wherein the first gas stream has a dust concentration of at least 5 mg/$Nm^3$ and the second gas stream comprises at least 50% of the amount of dust in the first gas stream.

2. The method of claim 1, wherein the first gas stream has a dust concentration of at least 10 mg/$Nm^3$.

3. The method of claim 1, wherein the first gas stream has a dust concentration of at least 20 mg/$Nm^3$.

4. The method of claim 1, wherein the first gas stream has a dust concentration of at least 30 mg/$Nm^3$.

5. The method of claim 1, wherein the first gas stream has a dust concentration of at least 70 mg/$Nm^3$.

6. The method of claim 1, wherein the second gas stream comprises at least 60% of the amount of dust in the first gas stream.

7. The method of claim 1, wherein the second gas stream comprises at least 80% of the amount of dust in the first gas stream.

8. The method of claim 1, wherein the contacting occurs at a temperature in the range of from 100 to 250° C.

9. The method of claim 1, wherein the contacting occurs at a temperature in the range of from 140 to 220° C.

10. The method of claim 1, wherein the ceramic or metallic foam catalyst has from 5 to 50 pores per inch.

11. The method of claim 1, wherein the ceramic or metallic foam catalyst has from 10 to 30 pores per inch.

12. The method of claim 1, wherein the first flow direction is orthogonal to the second flow direction.

13. The method of claim 1, comprising passing the second gas stream out of the contacting zone and into an outlet area of the reactor in the first flow direction.

14. The method of claim 1, wherein the first gas stream is generated from an industrial process.

15. The method of claim 1, comprising blocking a flow of the first gas stream and the second gas stream through a first end and a second end of the ceramic or metallic foam catalyst, respectively, wherein the first end is adjacent to an outlet area of the reactor and the second end is adjacent to an entrance zone of the reactor.

16. The method of claim 15, wherein contacting the first gas stream with the ceramic or metallic foam catalyst comprises flowing the first gas stream into and through a first side wall of the ceramic or metallic foam catalyst and flowing the second gas stream out through a second side wall of the ceramic or metallic foam catalyst, wherein the first side wall and the second side wall are disposed between and extend from the first end to the second end of the ceramic or metallic foam catalyst.

17. The method of claim 1, wherein a density range of the ceramic or metallic foam catalyst is between 0.4 to 0.75 grams/cubic centimeter (g/$cm^3$).

18. The method of claim 1, wherein the contacting occurs at a pressure range of from 0 kilopascals (kPa) to 1200 kPa.

19. The method of claim 1, wherein a surface area of the $NO_x$, reduction catalyst is between approximately 70 square meters/gram ($m^2$/g) and 150 $m^2$/g.

20. The method of claim 1, wherein the $NO_x$, reduction catalyst has a bimodal distribution having more than 90% of a pore volume present in pores having a diameter of at most 100 nanometers (nm).

21. The method of claim 20, wherein the pore volume is present in pores having a diameter of between approximately 1 nm and approximately 104 nm.

* * * * *